(No Model.)
G. M. GUERRANT.
MEANS FOR REDUCING FRICTION.
No. 482,902. Patented Sept. 20, 1892.
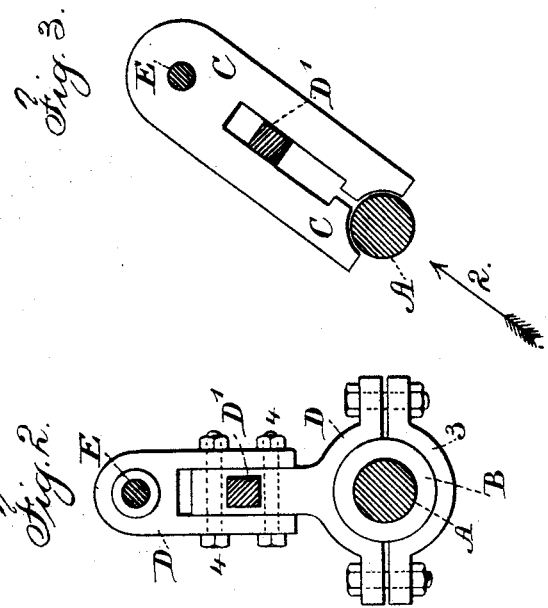
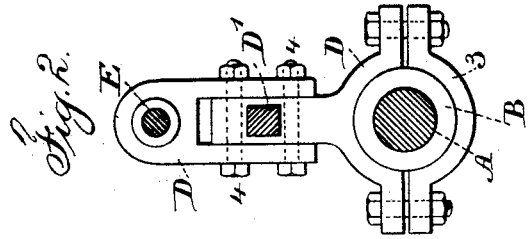
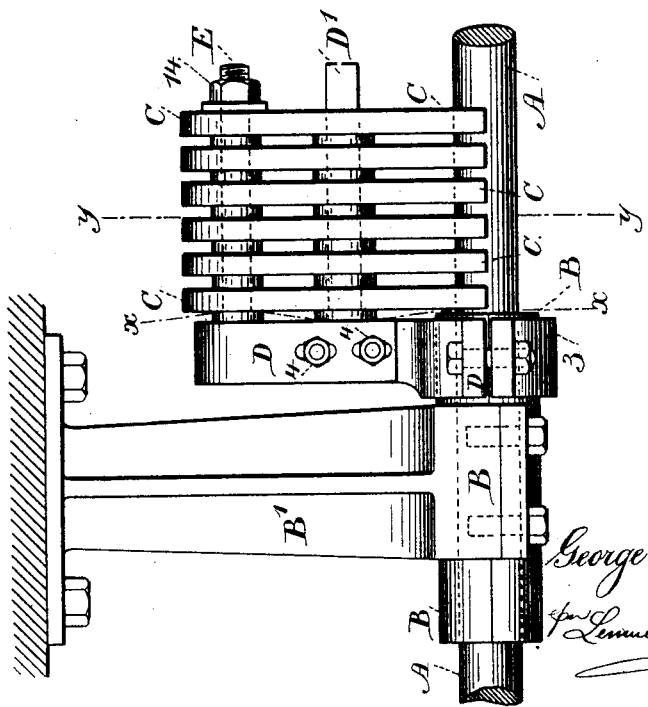
Witnesses
Chas H. Smith
J. Staib
Inventor
George M. Guerrant.
by Lemuel W. Serrell
atty

UNITED STATES PATENT OFFICE.

GEORGE M. GUERRANT, OF NEW YORK, N. Y., ASSIGNOR TO HIMSELF, AND THEODORE F. YOUNG, OF CLINTON, NEW JERSEY.

MEANS FOR REDUCING FRICTION.

SPECIFICATION forming part of Letters Patent No. 482,902, dated September 20, 1892.

Application filed October 7, 1891. Serial No. 407,987. (No model.)

*To all whom it may concern:*

Be it known that I, GEORGE M. GUERRANT, a citizen of the United States, residing in the city and State of New York, have invented an Improvement in Means for Reducing Friction, of which the following is a specification.

Shafts, spindles, and other rotating devices in machinery are constantly exposed to the friction resulting from the weight of the part that is being rotated, and this is often augmented by the pull of a belt around a pulley or the weight of pulleys or gear-wheels upon such rotating shaft. Efforts have been made to lessen the friction by wheels introduced in bearings and also by electro-magnets applied to the axles of car-wheels; but where electro-magnets are made use of there is a constant expenditure of power in energizing the same by an electric current.

My invention is made for adapting a permanent magnet or magnets to exert their attractive force upon the shaft or other rotating device in a direction opposite to that of the weight or of the belt or other device that causes friction upon the shaft or other rotating device in its bearings.

In the drawings, Figure 1 is an elevation representing my improved mechanism for reducing friction transversely of the shaft. Figs. 2 and 3 are cross-sections at the lines $x\,x$ and $y\,y$, respectively, of Fig. 1.

The shaft A is supported in a box or bearing B, and C represents a permanent magnet the attraction of which is in the direction of the arrow 2, and the poles of this permanent magnet are placed in proximity to the shaft A, so as to tend to draw the shaft toward the magnet, and where the friction of the shaft in its box or bearing is principally downwardly in consequence of the weight of the shaft the permanent magnet is to be above the shaft; but where a belt passes off at an angle or there is a strain upon the shaft in one direction or the other the permanent magnet should be contiguous to the shaft at the opposite side to where the principal friction arises.

I have represented the present improvement as applied in connection with a hanging box or bearing, and I have shown the box as extended at each side of the hanger B', such portions of the box B being circular for the reception of the clamps 3 at the inner ends of a frame D, so that by slackening the bolts of the clamps 3 the frame D can be rotated more or less around the circular portions of the box or bearing B and clamped in whatever position may be desired in order that the magnets C, that are supported by the frame D, may exert their force in the desired direction.

It is preferable to make use of a series of permanent magnets C, each magnet having poles with curved faces at the end thereof, so as to be adjacent to the surfaces of the shaft, arbor, or spindle that is to be acted upon, and these magnets C are connected to the frame D in any suitable manner, preferably by the rod E passing through openings in the permanent magnets, and the arm D' of the frame D passes into the opening or fork of each permanent magnet, so that such magnets are kept properly in range with each other and out of contact with the shaft, arbor, or spindle A, and in order to regulate the force of the magnets as they tend to attract the shaft and lessen the pressure thereof upon the bearing I prefer to make the frame D in two pieces, with adjusting screws or clamps 4, so that the poles of the magnets C may be in closer or more distant proximity to the surface of the shaft and thereby regulate the force exerted in reducing the friction.

Washers of paper or other suitable material may be placed between the permanent magnets C, if desired, and a nut 14 be used to clamp the magnets on the rod E.

I have shown magnets at one side of the hanger or bearing. They, however, should be applied at both sides of such bearing.

I claim as my invention—

1. The combination, with the shaft, arbor, or spindle, and the bearing for the same, of magnets with their poles in close proximity to the moving surface and means for holding and adjusting the position of such magnets around the shaft, whereby the direction in which the magnets act can be varied to lessen friction, substantially as specified.

2. The combination, with the shaft or other article, of a bearing for the same, having a circular projection around the shaft, a frame and clamps for securing the same to the circular projection, and permanent magnets supported by such frame, substantially as set forth.

3. The combination, with the shaft or other article, of a bearing for the same, having a circular projection around the shaft, a frame and clamps for securing the same to the circular projection, permanent magnets supported by such frame, and arms extending from the frame, and adjusting mechanism for varying the distance between the poles of the permanent magnets and the shaft, substantially as set forth.

Signed by me this 2d day of October, 1891.

GEO. M. GUERRANT.

Witnesses:
   GEO. T. PINCKNEY,
   WILLIAM G. MOTT.